(12) United States Patent
Biggs et al.

(10) Patent No.: US 6,393,927 B1
(45) Date of Patent: May 28, 2002

(54) METHOD AND APPARATUS FOR REAL-TIME DETERMINATION AND APPLICATION OF NITROGEN FERTILIZER USING RAPID, NON-DESTRUCTIVE CROP CANOPY MEASUREMENTS

(75) Inventors: Gregory L. Biggs, Lincoln; Tracey M. Blackmer, Malcolm; Tanvir H. Demetriades-Shah, Lincoln; Kyle H. Holland, Lincoln; James S. Schepers, Lincoln; John Henry Wurm, Lincoln, all of NE (US)

(73) Assignee: Li-Cor, Inc., Lincoln, NE (US)

( * ) Notice: Subject to any disclaimer, the term of this patent is extended or adjusted under 35 U.S.C. 154(b) by 0 days.

(21) Appl. No.: 08/727,125

(22) Filed: Oct. 8, 1996

Related U.S. Application Data

(63) Continuation-in-part of application No. 08/410,783, filed on Mar. 24, 1995, now abandoned.

(51) Int. Cl.[7] ............................................. A01C 15/00
(52) U.S. Cl. ..................................................... 73/866
(58) Field of Search ............................... 73/19.01, 866, 73/627–629; 239/146, 722, 723, 727, 728, DIG. 15; 222/52; 111/904, 903, 118, 127–129; 47/48.5, 1.5; 250/339.01, 339.02; 356/402, 425, 432, 433, 445, 448

(56) References Cited

U.S. PATENT DOCUMENTS

| 4,662,563 A | * | 5/1987 | Wolfe, Jr. .................... 239/728 |
| 4,795,899 A | * | 1/1989 | Pilot et al. | |
| 4,804,849 A | | 2/1989 | Booth et al. ............. 250/459.1 |
| 4,804,850 A | | 2/1989 | Norrish et al. ........... 250/459.1 |
| 4,825,078 A | * | 4/1989 | Huber et al. | |
| 5,104,436 A | | 4/1992 | Lauderdale et al. ........... 71/27 |
| 5,220,876 A | | 6/1993 | Monson et al. .............. 111/130 |
| 5,355,815 A | | 10/1994 | Monson ....................... 111/200 |

OTHER PUBLICATIONS

Kleman, J. "Influence of Different Nitrogen and Irrigation Treatments on the Spectral Reflectance of Barley", *Remote Sensing of Environment*, 21:1–14 (1987).

(List continued on next page.)

*Primary Examiner*—Robert Raevis
(74) *Attorney, Agent, or Firm*—Vincent L. Carney

(57) ABSTRACT

A method and apparatus for the real time determination and application of optimum amounts of nitrogen fertilizer to corn and other arable crops such as cotton, sugar beats, wheat, etc. by the use of rapid, non-destructive sensors and various fertilizer application methods. In a first embodiment, optical reflectance measurements of the crop canopy and a reference strip at the fertilizer response plateau are taken by sensors carried by a center pivot irrigation system. A sensor controller receives, stores and analyzes the sensor data as well as position data received from a center pivot controller. The sensor controller then sends commands to the center pivot controller to order fertilizer application, as necessary, through the irrigation system.

A second embodiment of the invention utilizes a tractor drawn fertilizer applicator with the sensors mounted on the application booms. As in the first embodiment, a sensor controller receives, stores and analyzes reference strip and crop canopy reflectance data and sends commands to the tractor fertilizer controller to order fertilizer application. This second embodiment may also utilize the Global Positioning System to provide tractor position for storage along with crop data for later use and comparison.

7 Claims, 12 Drawing Sheets

OTHER PUBLICATIONS

Blackmer et al., "Light Reflectance Compared with Other Nitrogen Stress Measurements in Corn Leaves", *Agron. J.* 86:1–3 (1994).

Penuelas, J. et al., "Reflectance Indices Associated with Physiological Changes in Nitrogen–and Water–Limited Sunflower Leaves", *Remote Sens.Environ.,* 48:135–146 (1994).

Demetriades–Shah, T.H. et al., "Oblique View Reflectance for Assessing Nitrogen Status of Incomplete Canopies", *Int.J.Remote Sensing,* 1987, vol. 8, No. 7, 1049–1055.

Peterson, Todd A. et al., Using A Chlorophyll Meter to Improve N Management, *Neb. Guide,* G93–1171–A, D–13 Jul. 1993.

McMurtrey III, J.E. et al. "Distinguishing Nitrogen Fertilization Levels in Field Corn (*Zea mays L.*) with Actively Induced Fluorescene and Passive Reflectance Measurements", *Remote Sens. Environ* 47:36–44 (1994).

Demetriades–Shah, T.H. et al., "High Spectral Resolution Indices for Monitoring Crop Growth and Chlorosis"; Proceedings of the 4th Int'l. Colloquium on Spectral Signatures of Objects in Remote Sensing—held at Aussois, France, Jan. 18–22 1998.

Schepers, James et al., "Monitoring Nitrogen Status of Corn", Proceedings of The Integrated Crop Management Conference: The Consequences of the Floods of 1993, Dec. 1 and 2, 1993 Iowa State University, Ames, IA.

Felton, W.L. et al., "Automated Agriculture for the 21st Century", Proceedings of the 1991 Symposium, Dec. 16–17 1991, Chicago, IL.

Thomas, J.R. et al. "Estimation of Crop Conditions and Sugarcane Yields Using Aerial Photography" Proceedings of American Society of Sugar Can Technologists, 1976 Meetings, Vo. 6, pp. 93–99.

* cited by examiner

METHOD AND APPARATUS FOR REAL-TIME DETERMINATION AND APPLICATION OF NITROGEN FERTILIZER USING RAPID, NON-DESTRUCTIVE CROP CANOPY MEASUREMENTS

CROSS-REFERENCE TO RELATED APPLICATIONS

This application is a Continuation-in-Part of Application Ser. No. 08/410,783, filed Mar. 24, 1995, now abandoned, the disclosure of which is hereby incorporated by reference herein in its entirety.

STATEMENT REGARDING FEDERALLY SPONSORED RESEARCH OR DEVELOPMENT

Not Applicable.

BACKGROUND OF THE INVENTION

1. Field of the Invention

This invention relates to agriculture, and more particularly to a method and apparatus for determining a need for fertilization in a crop and applying the fertilizer in response to that measurement in real time.

2. Description of the Related Art

The strong relationship between nitrogen availability in soil and crop yields is well known in the art. Of the major plant nutrients (N, P, K, Ca, Mg, and S), nitrogen is the nutrient required in the greatest quantities and much research has been conducted over the years to determine the nitrogen fertilizer requirements of crops. Applying too little nitrogen causes severe economic losses by reducing crop yields, while applying too much nitrogen is not only expensive but also causes harmful levels of $NO_3$ to leach into the ground and surface water supplies.

Determining the need for nitrogen is particularly difficult since most soil nitrogen is tied up in the soil organic matter and is unavailable to plants. The amount of nitrogen that is made available (in the form of $NO_3$ and $NH_4$) to plants during the growing season depends strongly on factors such as the previous cropping history of the field, soil organic matter content, microbial activity and rainfall (which quickly leaches the available forms of nitrogen away from the root zone). These difficulties have led some investigators to explore the use of plant nitrogen analysis instead of soil tests, since the plant itself should be a reliable indicator of the amount of nitrogen available to it.

Chemical assaying of plant nitrogen status is typically a slow and time consuming process because, as in the case of corn, about a dozen leaves are usually collected which must then be dried, ground, and analyzed using one of several laboratory techniques. Interpreting the laboratory data involves considerable uncertainty because leaf nitrogen concentrations decrease during the growing season and nitrogen concentrations further depend on which leaf is sampled. These difficulties led to efforts to develop rapid, non-destructive methods for assessing the nitrogen status of crops.

Crops that are well-supplied with nitrogen grow vigorously and look deep green in color due to their high leaf chlorophyll concentrations, while crops deficient in nitrogen grow less well and look yellow-green (chlorotic) due to low concentrations of chlorophyll. This led to the development of a device for measuring leaf chlorophyll content, called a chlorophyll meter, which measures light transmittance through individual leaves in the red (approximately 670 nm) and near-infrared (approximately 800 nm) regions of the electromagnetic spectrum. Furthermore, above a certain level of nitrogen fertilizer application, crop growth and chlorophyll content reach a plateau or a maximum, referred to hereinafter as the nitrogen fertilizer response plateau. This permits the use of a reference strip which provides a baseline against which nitrogen stress can be measured. However, due to the fact that a very great number of leaf measurements must be taken in order to survey an entire field for variable rate fertilizer adjustments, this method has not been widely accepted in commercial agriculture.

An additional problem with leaf chlorophyll or leaf color measurements is that the difference in leaf chlorophyll (or color) between a nitrogen deficient plant and a nitrogen sufficient plant is relatively small. By the time nitrogen fertilizer deficiency has caused a detectable change in leaf color, significant and unrecoverable yield reductions have already taken place. Therefore, leaf chlorophyll measurements using leaf transmittance have to be very precise, requiring measurements to be done under controlled illumination and light-path geometry. Measurements must be done on individual leaves clamped within an instrument. It is not possible at present to measure the entire crop canopy chemical attributes (color, chlorophyll or nitrogen concentration) with sufficient precision to be of value for detecting nitrogen deficiencies before irretrievable losses have already taken place. Measuring entire crop canopy reflectance in the green band does not measure leaf greenness (i.e. color), it merely measures the reflection in the green band of contrasting targets within the field of view of the sensor (plants, soil and shadows). Using chlorophyll fluorescence is even more problematic because fluorescence is not only a function of nitrogen status and leaf chlorophyll content but also depends on the short-term changes in the plant's metabolic pathways. Fluorescence is a very unstable physiological parameter which varies from hour to hour with illumination, drought and a variety of other stresses. It is difficult to see how it could be used for determining the nitrogen needs of a field crop.

A more sensitive alternative to measuring color change is to measure changes in standing crop biomass or some other physical attribute such as leaf area, crop density, crop cover, etc. Measuring the entire crop canopy physical attributes is radically different from and has several advantages over measuring individual leaf chemical attributes such as chlorophyll content or color. Changes in standing crop density, for example, show a greater sensitivity to nitrogen supply than do changes in leaf color. Also, the measurement is integrated over a larger area and is much easier to do in real time. It can, for example, be done from a tractor or center pivot using one of several rapid, non-destructive methods or from aircraft or satellites using crop reflectance.

Various rapid, non-destructive techniques for assessing standing crop biomass and other related canopy physical attributes such as leaf area index and percent ground cover have also been developed. Included among these is the measurement of canopy reflectance in the visible, near-infrared (NIR), and scattering in microwave regions of the electromagnetic spectrum. Other techniques for rapid, non-destructive estimation of crop standing biomass have included measurements of canopy electrical capacitance, attenuation of β-particles and other ionizing radiation, and measurements of crop canopy transmittance in certain regions of the solar spectrum (between 300 nm and 3000 nm). The use of acoustic energy for estimating the growth response of crops to fertilizer has not been reported in the literature. However, acoustic techniques have been used for a variety of other rapid, non-destructive measurements such as determining animal back-fat and pregnancy detection. Some of these methods have certain advantages over the present optical embodiment because they do not rely on sunlight. Recent tests by the inventors suggest that acoustic measurements can provide the canopy information necessary for determining crop nitrogen requirements.

Standing alone, these measurements of entire crop canopy physical attributes have little commercial value. Also, the measurements are only relative and have values that depend on the conditions of measurement such as crop growth stage, canopy structure, and environmental conditions. However, combining one of the measures of crop density in real time with the use of a reference strip provides a relative measurement that is sufficient to determine crop nitrogen status and the need for fertilizer in real time.

BRIEF SUMMARY OF THE INVENTION

The present invention discloses a method and apparatus for the real time determination and application of optimum amounts of nitrogen fertilizer to corn and other arable crops such as cotton, sugar beets, wheat, etc. by the use of rapid, non-destructive crop canopy sensors and various fertilizer application methods. In a first embodiment, optical reflectance measurements of the crop canopy and a reference strip at the fertilizer response plateau are taken by sensors carried by a center pivot irrigation system. A sensor controller receives, analyzes and stores the sensor data as well as position data received from the center pivot controller. The sensor controller then sends commands to the center pivot controller to order fertilizer application, as necessary, through the irrigation system.

A second embodiment of the invention utilizes a tractor drawn fertilizer applicator with the sensors mounted on the application boom. As in the first embodiment, a sensor controller receives, analyzes and stores reference strip and crop canopy reflectance data and sends commands to the tractor fertilizer controller to order fertilizer application. This second embodiment may also utilize the Global Positioning System to provide tractor position for storage along with crop data for later use and comparison.

The location and size of the reference strips will depend on the particular embodiment in use. In the first embodiment, the reference strip would preferably consist of a ring of crop from which a particular sensor could continually receive data as the irrigation system pivots around the field. In the second embodiment, a series of reference strips may extend across the field for continual monitoring, or a reference area may provide reference data which would then be memorized by the sensor controller. The establishment of the reference strips will depend to a large extent on convenience and preference of the farmer.

DETAILED DESCRIPTION OF THE INVENTION

As previously noted, crops that are well-supplied with nitrogen grow vigorously while crops deficient in nitrogen grow less well. The development of various sensing techniques has made it possible to monitor the physical attributes of a crop canopy. For example, reflectance sensors include a variety of band-pass radiometers and spectroradiometers. Band-pass radiometers typically measure reflectance at selected bands of the electromagnetic spectrum, whereas spectroradiometers provide continuous spectral reflectance measurements over all wavelengths within the spectral range of sensitivity of the spectroradiometer.

Measurements and comparisons of the spectral reflectance characteristics of crop canopies in the visible and infrared regions of the electromagnetic spectrum can provide significant data about the entire canopy attributes. This data can in turn provide information on crop stress, whether due to drought, nitrogen (N) deficiency, or other factors which affect crop growth or structure.

Figure 1:
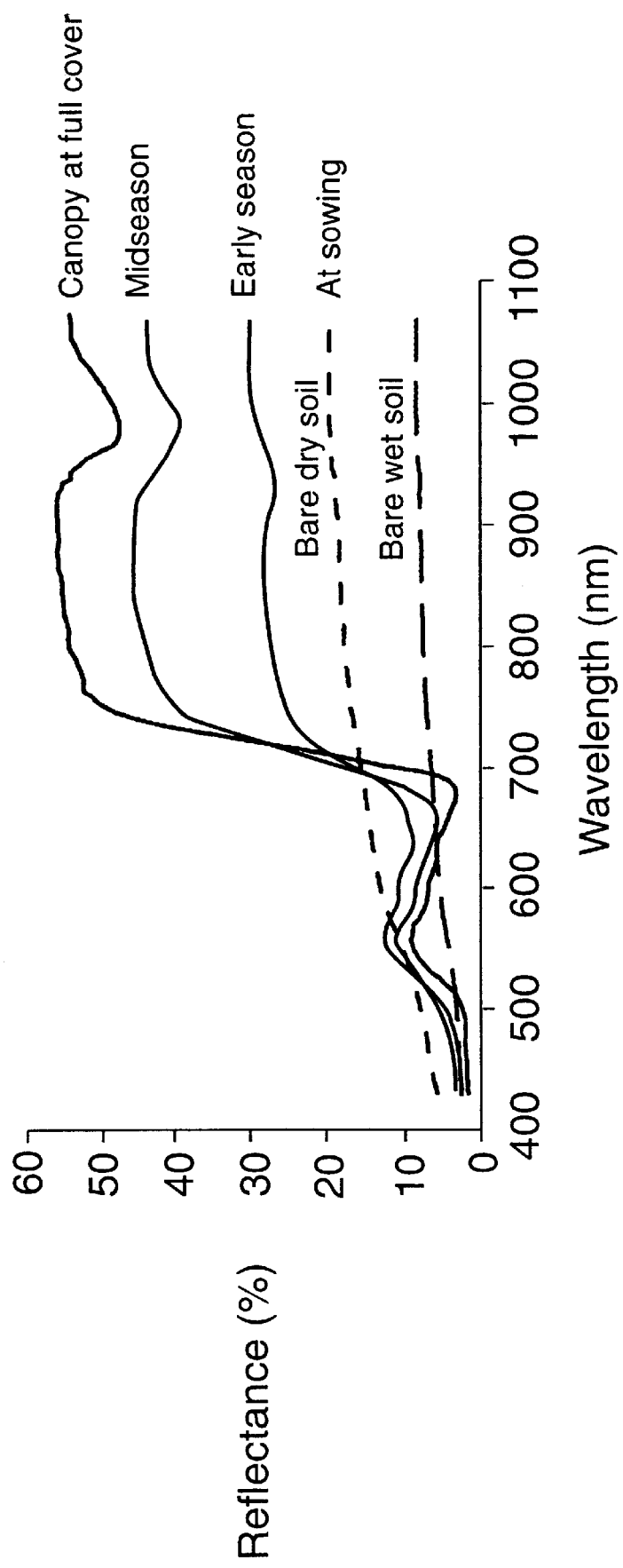
FIG. 1 depicts the continuous spectral reflectance of light between 400 and 1100 nanometers from a crop canopy at various growth stages up to full cover and also depicts reflectance for dry and wet soil.

FIG. 1 shows the continuous spectral reflectance of a green crop canopy at several growth stages from sowing to full cover which has received adequate nitrogen to reach the fertilizer response plateau at each stage. Also shown is the spectral reflectance of bare soil in wet and dry states. (Reflectance here is expressed as the fraction of light reflected from a barium sulfate standard surface). The soil reflectance generally increases with increasing wavelength, but the overall brightness of different soils can vary greatly from place to place and also with moisture content. The wet soil in FIG. 1, for example, is considerably darker than the dry soil. A non-imaging radiometer looking down at the crop-soil composite scene will integrate the signals from the green vegetation and the soil background as well as the shadows. As the crop begins to grow and cover the soil, the spectral reflectance measured by the radiometer gradually changes from the spectrum of the bare soil to the spectrum of green vegetation. Thus canopy reflectance in the near-infrared (around 800 nm) increases with increasing plant cover, whereas reflectance in the visible (between 400 nm and 700 nm) generally decreases because of absorption by the leaf pigments. Therefore, only by comparing areas of crop at the same growth stage supplied with high levels of nitrogen (reference) and lower level of nitrogen, is it possible to know if the crop with lower levels is nitrogen deficient. This simple, innovative approach has never been used to correct crop nitrogen deficiencies in real time.

Figure 2:
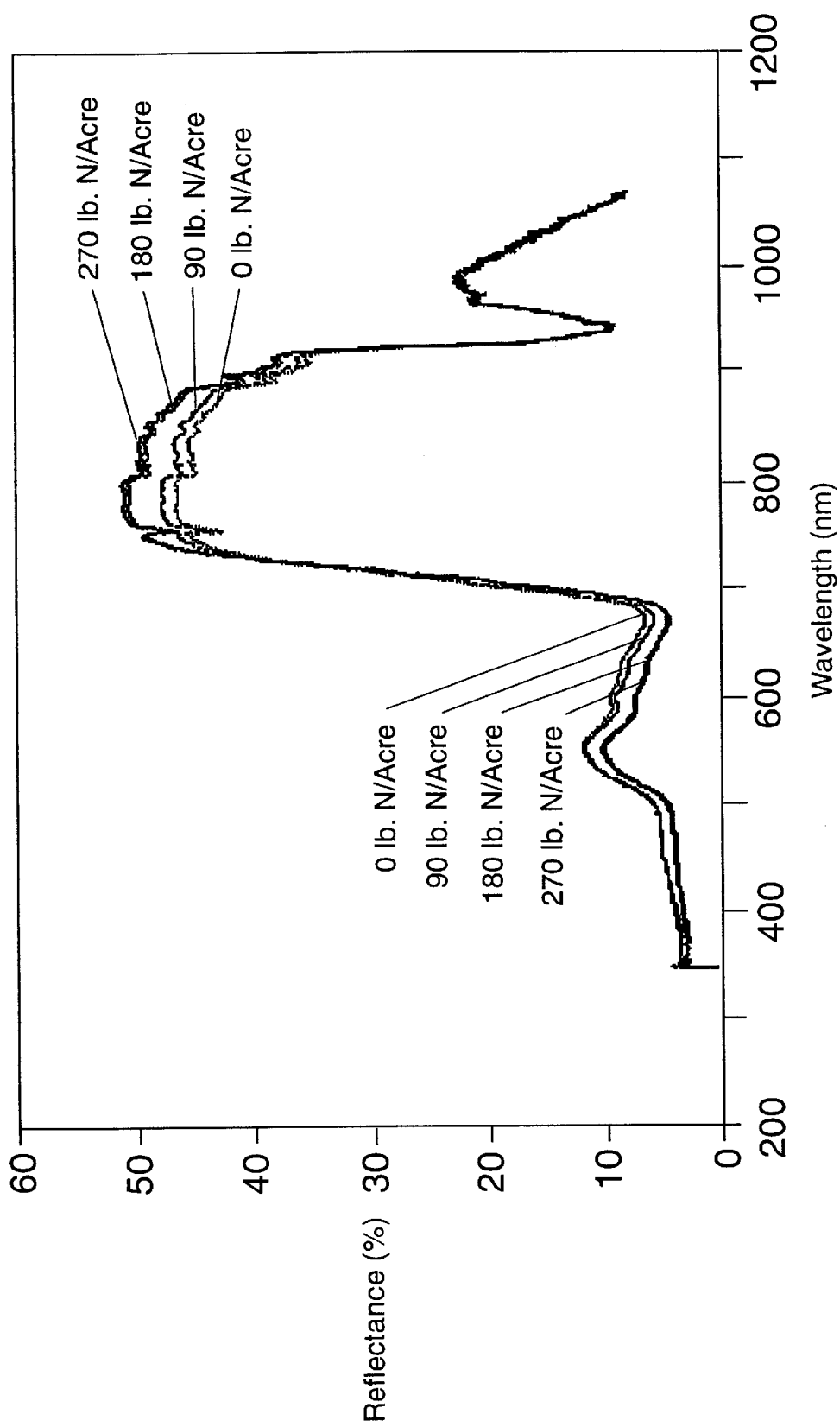
FIG. 2 depicts the continuous spectral reflectance of light between 350 and 1100 nanometers from four crop canopies receiving various levels of nitrogen fertilization.

FIG. 2 depicts the continuous relative light reflectance spectra between 350 nm and 1100 nm of four green crop canopies receiving various levels of nitrogen fertilization, ranging from zero to 270 pounds/acre, as compared to a barium sulfate standard surface. The spectral differences between the different nitrogen rate plots is primarily caused by differences in percent ground covered, and not due to small differences in leaf color. The reflectance differences are relatively small because there were high levels of residual nitrogen in the soil, and adding more nitrogen had little effect on crop growth.

Figure 3:
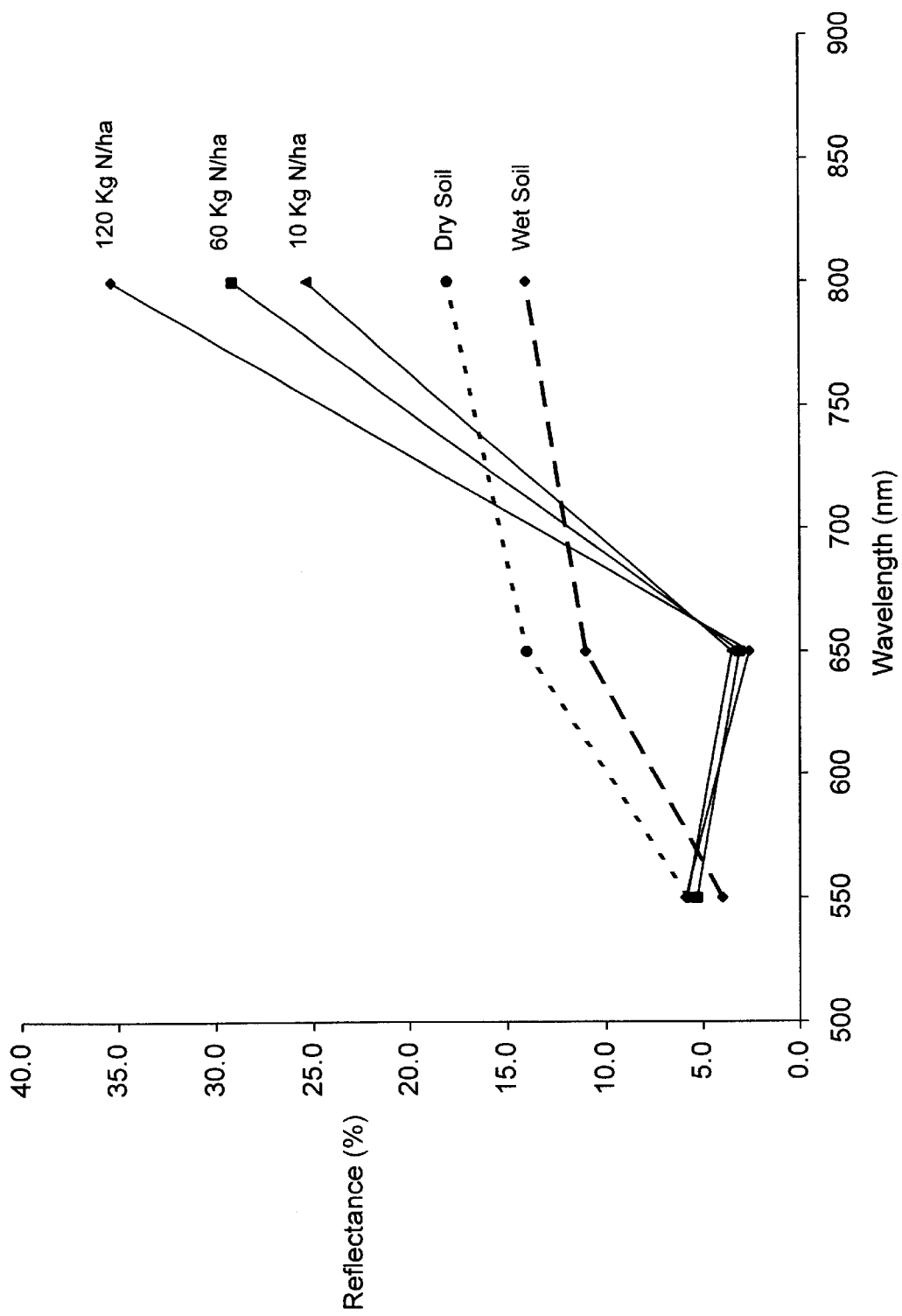
FIG. 3 depicts the narrow band reflectance at 550 nm (green), 650 nm (red), and 800 nm (NMR) for dry and wet soil and a corn canopy receiving three different levels of nitrogen fertilization.

FIG. 3 is a plot of reflectance measurements taken with a band-pass radiometer at 550 nm (green), 650 nm (red), and 800 nm (NIR) on a corn canopy receiving three different nitrogen rates, ranging from 10 to 120 kilograms of nitrogen per hectare. In this particular case, the crop receiving the 120 Kg N/ha was at the nitrogen fertilizer plateau and provided an excellent reference for the two corn crops which were nitrogen deficient. It is apparent that visible reflectance in the green (550 nm) and red (650 nm) band changes very little with nitrogen rate. Several problems arise with the use of individual reflectance bands because different soils have different reflectances and this causes the composite canopy-soil reflectance to vary with soil brightness independently of the crop. Soil brightness, for example, can vary with soil moisture (FIGS. 1 and 3) or soil organic matter.

The table below presents the data plotted in FIG. 3 and includes the near-infrared to red reflectance ratio ($R_{800}/R_{650}$) as well as the leaf area (LAI) and chlorophyll meter data.

|  | % $R_{550}$ | % $R_{650}$ | % $R_{800}$ | $R_{800}/R_{650}$ | LAI | Chlorophyll |
|---|---|---|---|---|---|---|
| 120 Kg N/ha | 5.9 | 2.6 | 35.3 | 13.7 | 2.0 | 45.2 |
| 60 Kg N/ha | 5.3 | 3.1 | 29.1 | 9.59 | 1.3 | 45.2 |
| 10 Kg N/ha | 5.8 | 3.5 | 25.3 | 7.15 | 1.0 | 36.9 |
| Dry Soil | 5.8 | 14 | 18 | 1.24 | — | — |
| Wet Soil | 4.0 | 11 | 14 | 1.28 | — | — |

While the individual reflectance bands for the dry and wet soils differ greatly (e.g. 18% for dry and 14% for wet at 800 nm), their $R_{800}/R_{650}$ ratios change only slightly (1.24 for dry and 1.28 for wet). Conversely, the $R_{800}/R_{650}$ ratio enhances the measurement of crop density because the change in the ratio shows a greater response to the change in canopy leaf area than do the individual reflectance bands. For example, for leaf area index (LAI) changes from 1.0 to 2.0, the $R_{800}/R_{650}$ ratio changes from 7 to almost 14 whereas the individual canopy $R_{800}$ reflectance changes by only 10%. Clearly crop canopy physical attributes as measured by the $R_{800}/R_{650}$ ratio and LAI are more sensitive to nitrogen supply than the changes in chlorophyll. The chlorophyll meter readings were not able to distinguish the medium and high level nitrogen rates (both chlorophyll readings were 45.2). The crop growth was affected greatly but the change in leaf color was not detectable by the chlorophyll meter.

Using ratios of individual reflectance bands (i.e. NIR/Red) to create a reflectance index enhances the vegetation to soil contrast, and also minimizes the interferences from the soil background variations. The present invention, therefore, utilizes the near-infrared to visible reflectance ratio. It should be noted, however, that there are a number of other band combinations within the visible and infrared regions of the spectrum which can be used in place of the near-infrared to visible reflectance ratio.

Figure 4:
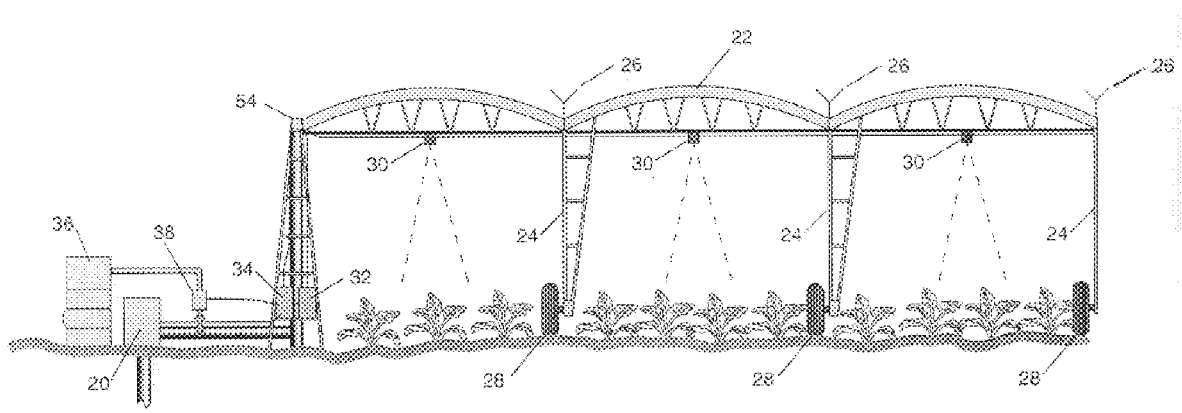
FIG. 4 is diagrammatic sideview of a center pivot irrigation system utilizing the present invention.

The preferred embodiment of the invention is depicted in FIG. 4 where it is used in conjunction with a center pivot irrigation system. Center pivot irrigation systems are well known in the art and are generally comprised of a central water pump (20), which typically receives water from a well, and an elongate radial water distribution pipe (22). The pipe (22) is elevated above the ground by a series of support towers (24) and carries a number of sprinklers (26) along its length. Each of the support towers (24) has a pair of wheels (28) which are driven electrically, hydraulically, or by water pressure.

Figure 5:
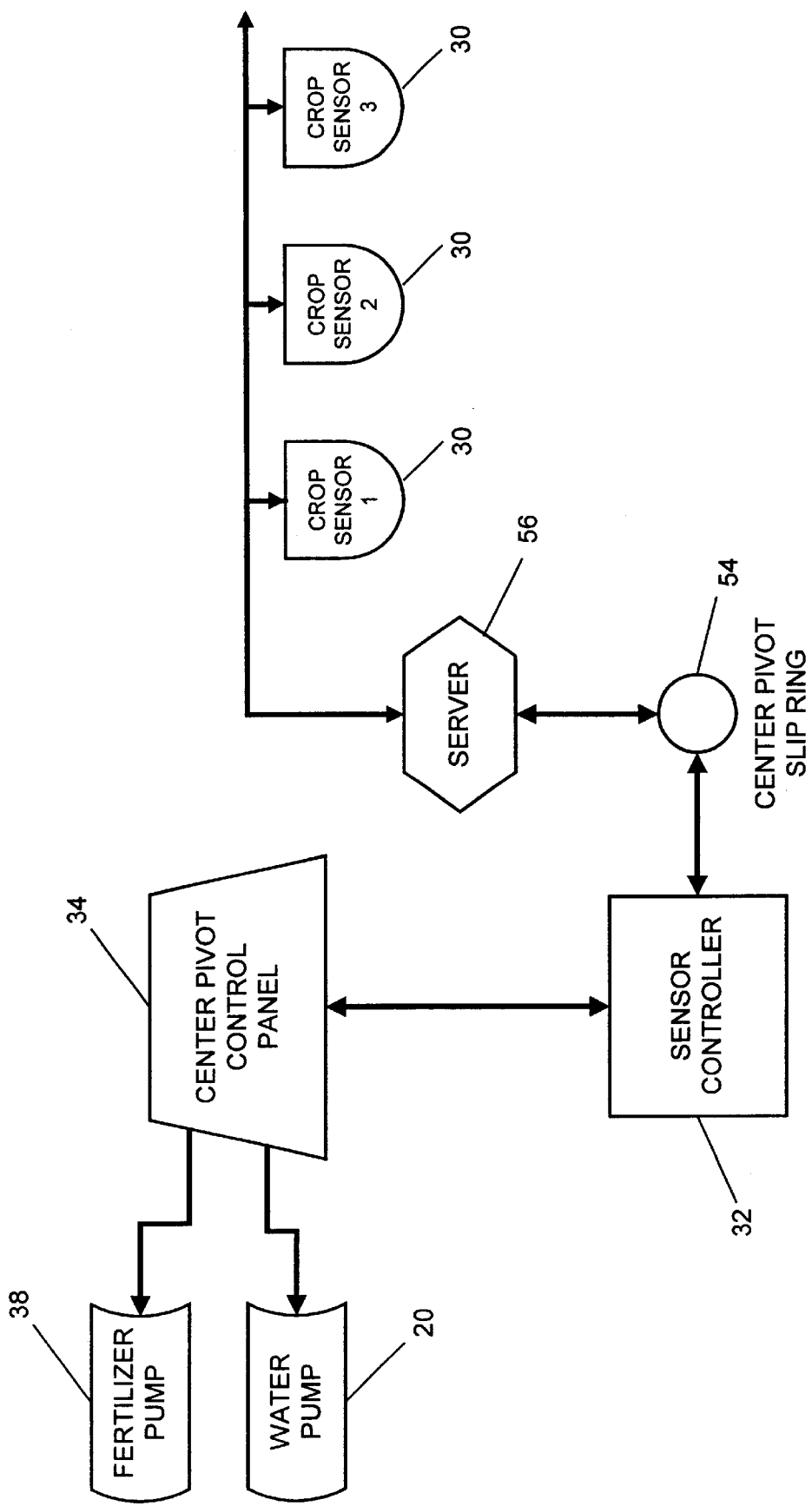
FIG. 5 is a block diagram of the center pivot embodiment of the invention.

Referring also to FIG. 5, a series of spaced apart crop sensors (30) are carried by the irrigation system and are used to detect relative differences in the crop density. This information is sent to the sensor controller (32), via a server (56) and slip ring (54), which communicates with the center pivot controller (34), which in turn controls the water pump (20) and fertilizer pump (38) which receives fertilizer from a storage tank (36).

Figure 6:
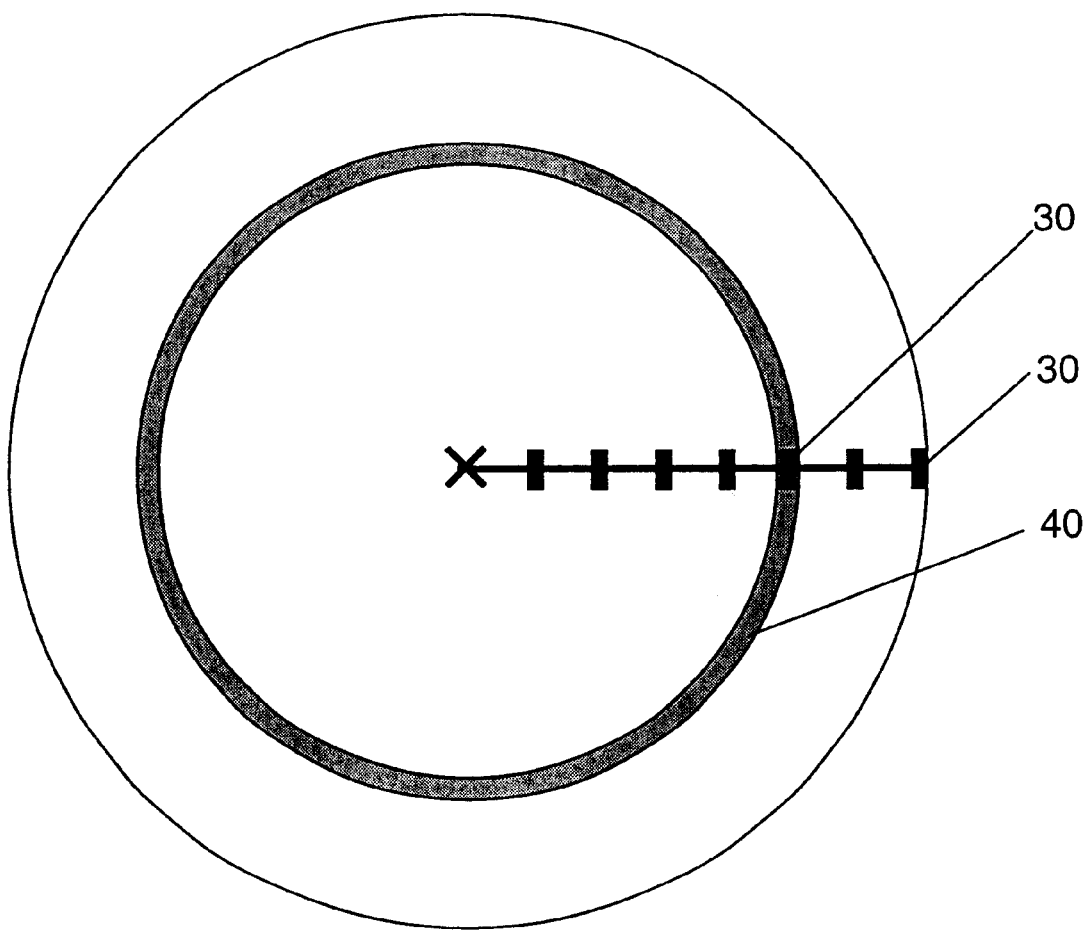
FIG. 6 is a top view of a crop field irrigated by a center pivot irrigation system utilizing the present invention and depicts the use of a circular reference strip.

A diagrammatic overhead view of a crop utilizing the center pivot embodiment is depicted in FIG. 6 and shows the use of a circular reference strip (40) of crop at the fertilizer response plateau. This strip may be created by injecting fertilizer into a particular sprinkler of the irrigation system or by the application of a larger amount of fertilizer prior to planting. One of the crop sensors (30) will monitor the reference strip (40) when crop measurements are being made to provide a reference point for the other sensors (30) measuring non-reference crops.

Figure 7:
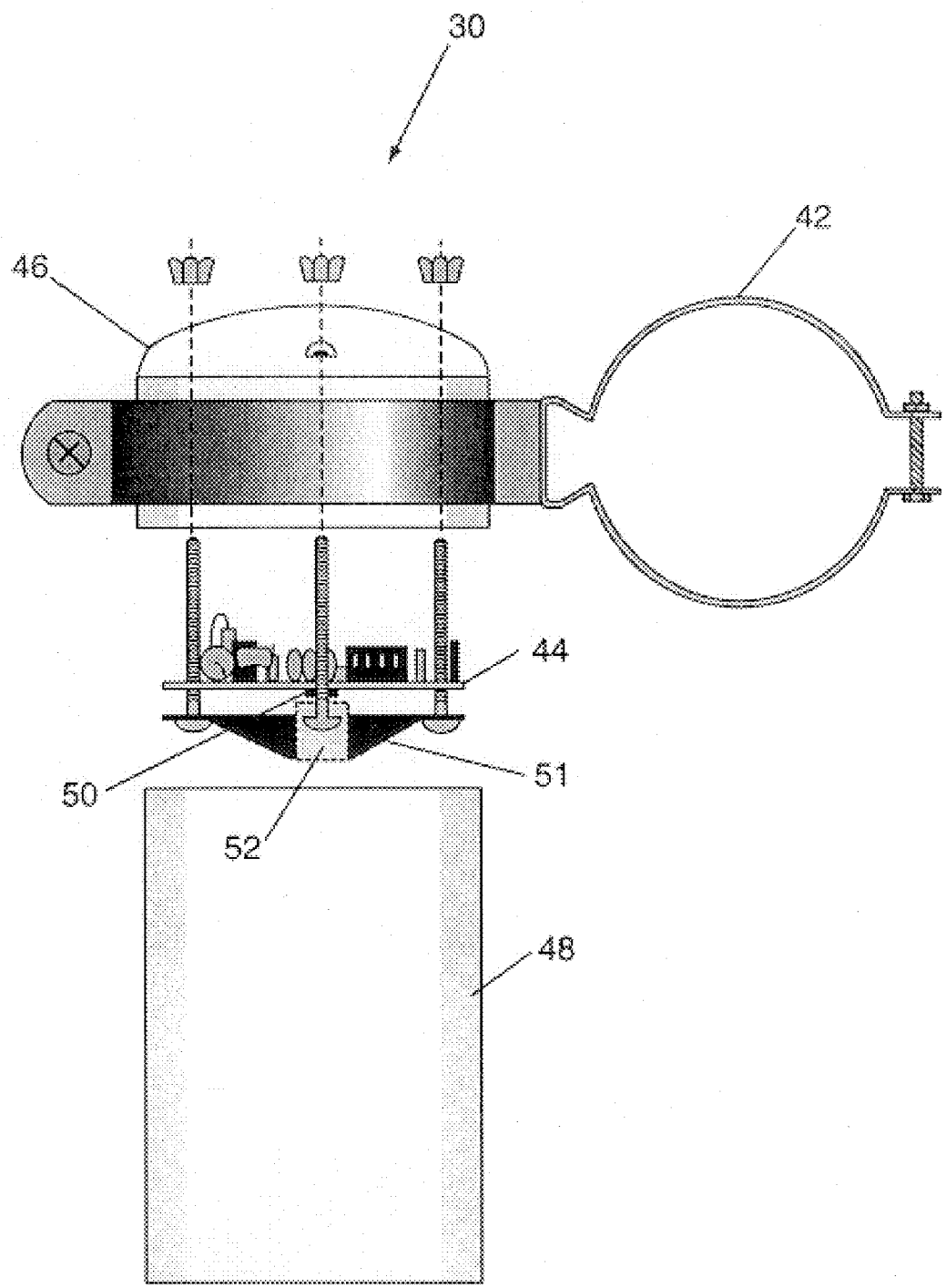
FIG. 7 is an exploded sideview of an optical crop sensor.

An optical crop sensor (30) is shown in FIG. 7 and is seen to comprise a mounting bracket (42), electronic components mounted on a circuit board (44) secured within a cap (46), and a view restrictor (48). The function of the crop sensor (30) is to detect relative differences in the crop density in the reference strip and the non-reference areas of the field. A number of different rapid, non-destructive techniques (e.g. ultrasonic, crop canopy light transmittance, crop canopy electrical capacitance, and microwave backscatter) can be employed to sense relative crop density. This preferred embodiment uses an optical sensor (30) which detects crop density differences on the basis of differences in the crop/soil reflectance contrast. The optical sensor (30) consists of two solid state detectors (50) that are sensitive to the near-infrared and the visible part of the reflected spectrum. The detectors (50) are mounted side-by-side inside the sensor housing. A light baffle (51) prevents stray light from reaching the detectors (50). A single diffuser (52) covers both detectors (50) so that they have a common optical path. This insures that they have a common field of view. More importantly, having a common optical path makes the sensors almost immune to calibration drift caused by dust which may settle on the optics. This is because soil and dust have spectral characteristics that are spectrally almost flat (see FIG. 1), and since we will be using a spectral ratio as an index of crop density, dust on the optics does not interfere greatly with the assessment of crop density/vigor.

The novel design of the sensor uses non-custom, low cost broad-band GaAsP (visible) and silicon (near-IR) detectors, whereas conventional design would call for two silicon based detectors or photomultiplier tubes, each with its own filter, which would need to be correctly aligned so that both detectors see the same area on the ground. Such a design would not only be more expensive but it would also be susceptible to calibration drift if dust accumulation on both detector/filter assemblies was not identical. An alternative design which would not be susceptible to dust-induced calibration drift would be to employ a dichroic beam splitter in front of the detectors, which would also be very expensive. Another advantage of using broad-band detectors is that they can operate under low light levels.

Figure 8:
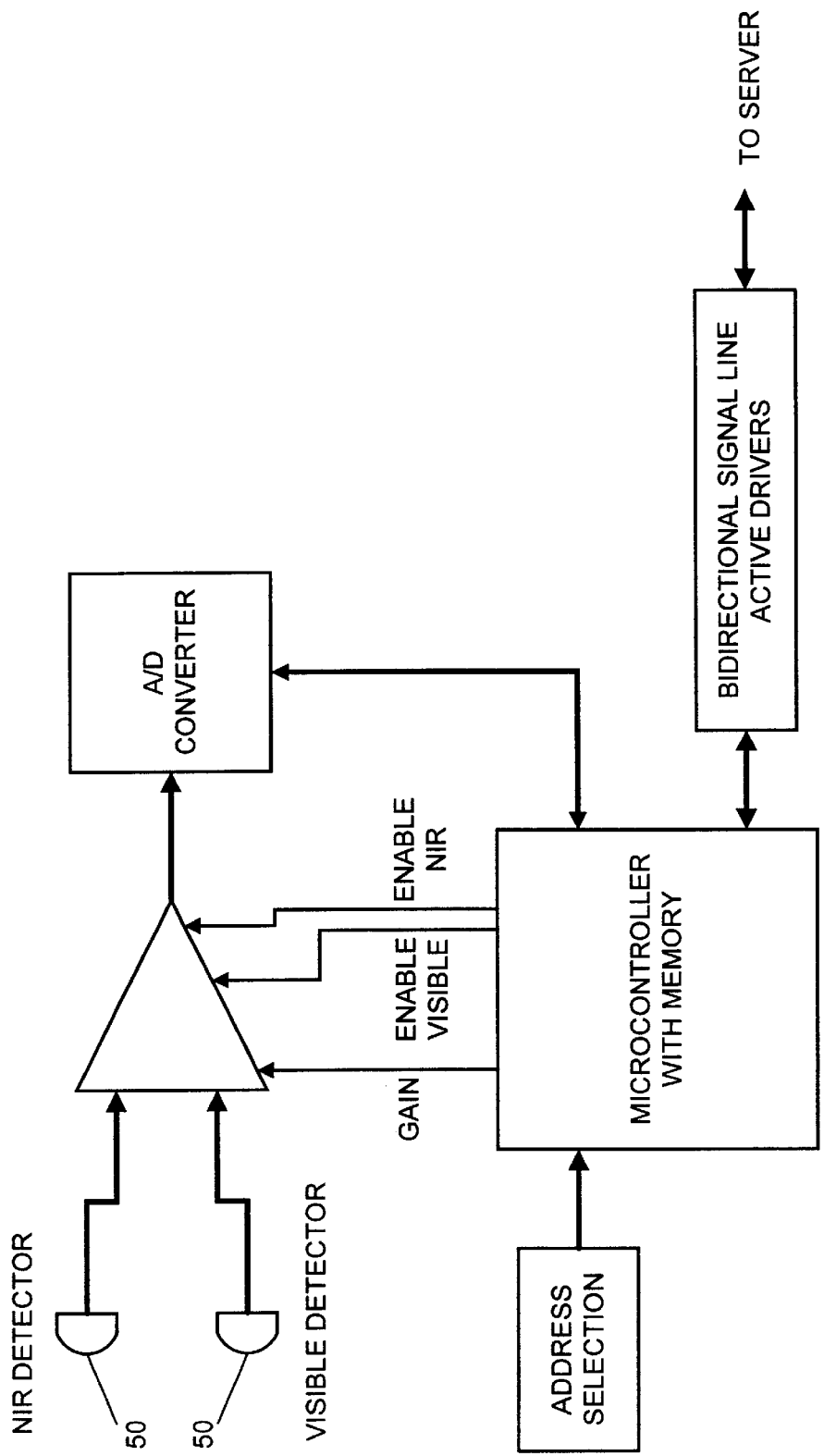
FIG. 8 is a block diagram of an optical crop sensor of the invention.

Referring to FIGS. 7 and 8, the output of the detectors (50) is amplified and filtered for noise reduction. Each sensor (30) has its own microcontroller which executes a program stored in its memory and waits for a command signal from the sensor controller (32) via a center pivot slip ring (54) and a server (56) to initiate measurement of detector signals. The microcontroller enables each detector (50) individually for output to the A/D converter and determines the correct gain for each sensor for the given illumination conditions. The microcontroller stores the signal from each detector and transmits it together with the sensor's address to the sensor controller (32) via the sensor server (56). Each sensor (30) also has its own power regulating circuit.

Figure 9:
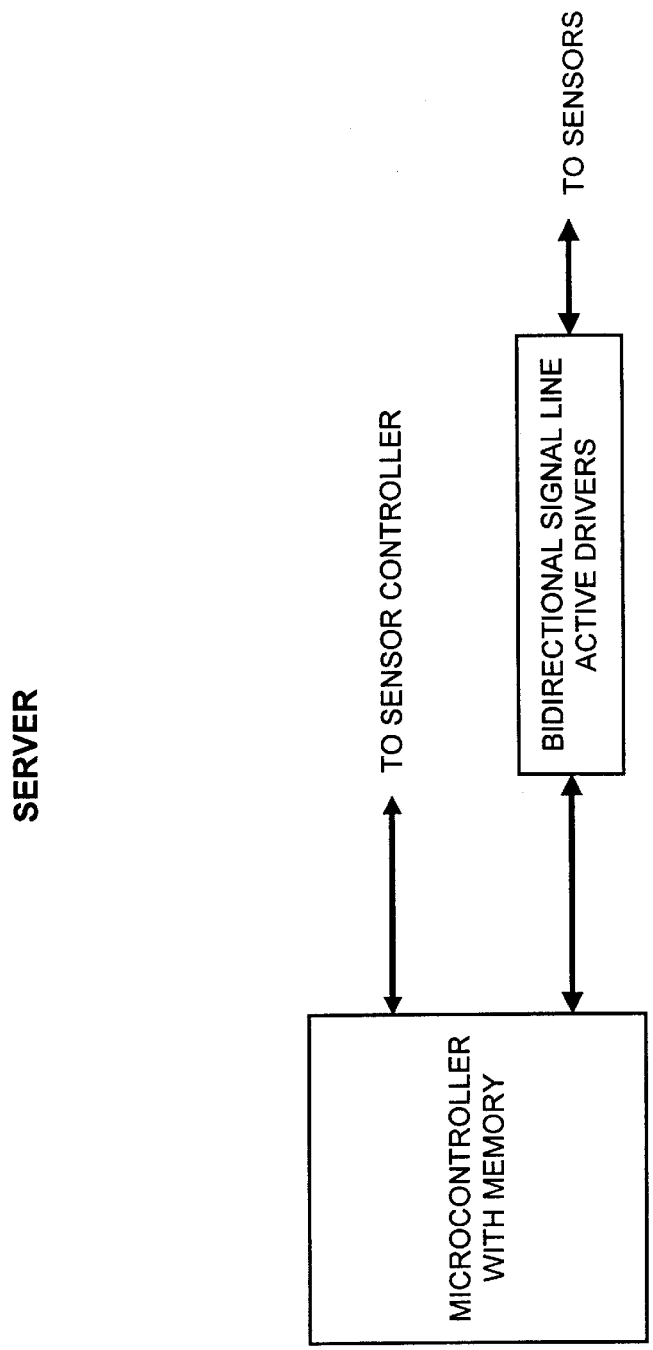
FIG. 9 is a block diagram of the server of the invention.

FIG. 9 depicts a block diagram of the server (56) which converts the long distance, single wire communication protocol used by the crop sensors (30) to a standard serial communications protocol used by the sensor controller (32) and allows data to be transmitted across the slip rings (54). For center pivots that do not go full circle, a cheaper direct line communication may be used. Radio frequency communication is also possible. The server (56) consists of a micro-controller and memory which executes a program and performs its functions on command from the sensor controller (32). The server (56) routes power to the sensors (30) and has its own power regulating circuit. The server (56) communicates with the sensors (30) through a 3 wire cable; one wire for the signal, one for power, and one for ground.

Figure 10:
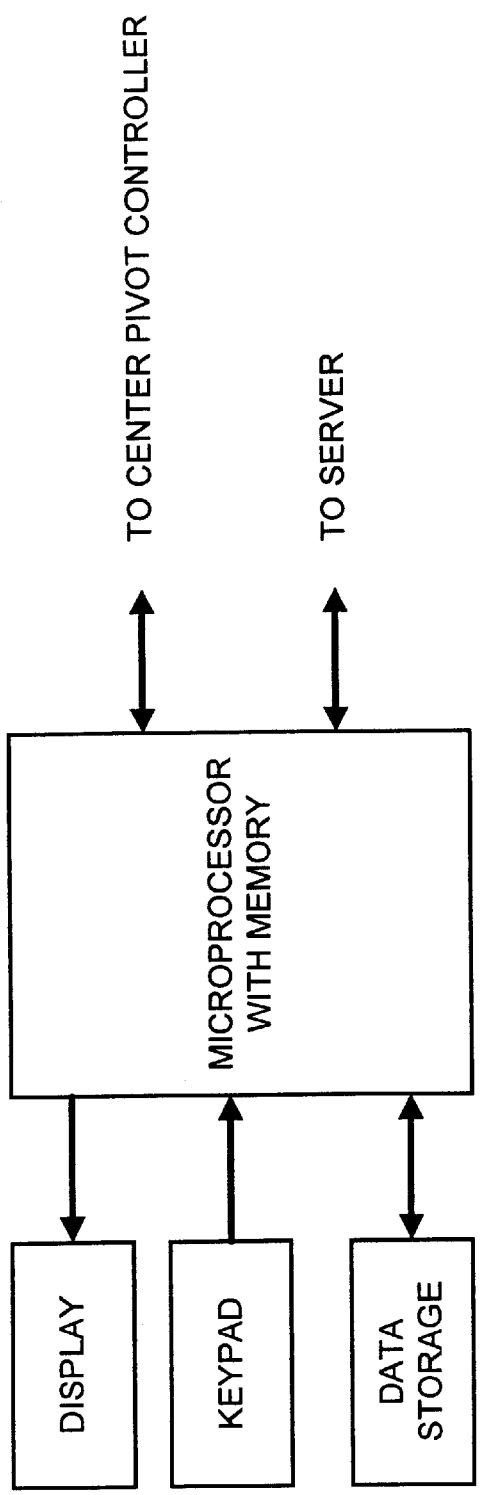
FIG. 10 is a block diagram of a sensor controller of the invention.

The sensor controller (32), shown as a block diagram in FIG. 10, is the nerve center of the entire system. The sensor controller (32) has a micro-processor and memory for storage and execution of a program which controls collection of data from the sensors (30). It analyzes the sensor data to determine nitrogen requirements and controls the center pivot functions (application of water and fertilizer, speed and direction of center pivot rotation) via the center pivot controller (34). Since the sensor controller (32) also receives center pivot angle, speed and direction information from the center pivot controller (34) in real-time, this information can be used in conjunction with the sensor data to formulate a "field map" for agronomic purposes, such as providing a mid-season potential yield map. The sensor controller (32) has a keypad and display to allow the farmer to view data and system functions and allows him to intervene in making fertilizer applications decisions. Memory is provided on the sensor controller (32) to store sensor data and the system fertilizer recommendations. The sensor controller (32) has all the hardware to allow for bi-directional communication between it and the center pivot controller (34) and also the server (56) and sensors (30).

The center pivot controller (34), a standard component of most center pivot irrigation systems, supplies power to the center pivot and monitors and controls all of the functions of the center pivot such as speed and direction of rotation, center pivot angle, and water and fertilizer application. The sensor controller (32) obtains information about the center pivot operation from the center pivot controller (34) and issues commands to apply nitrogen fertilizer according to the conditions under the sensors.

Figure 11:
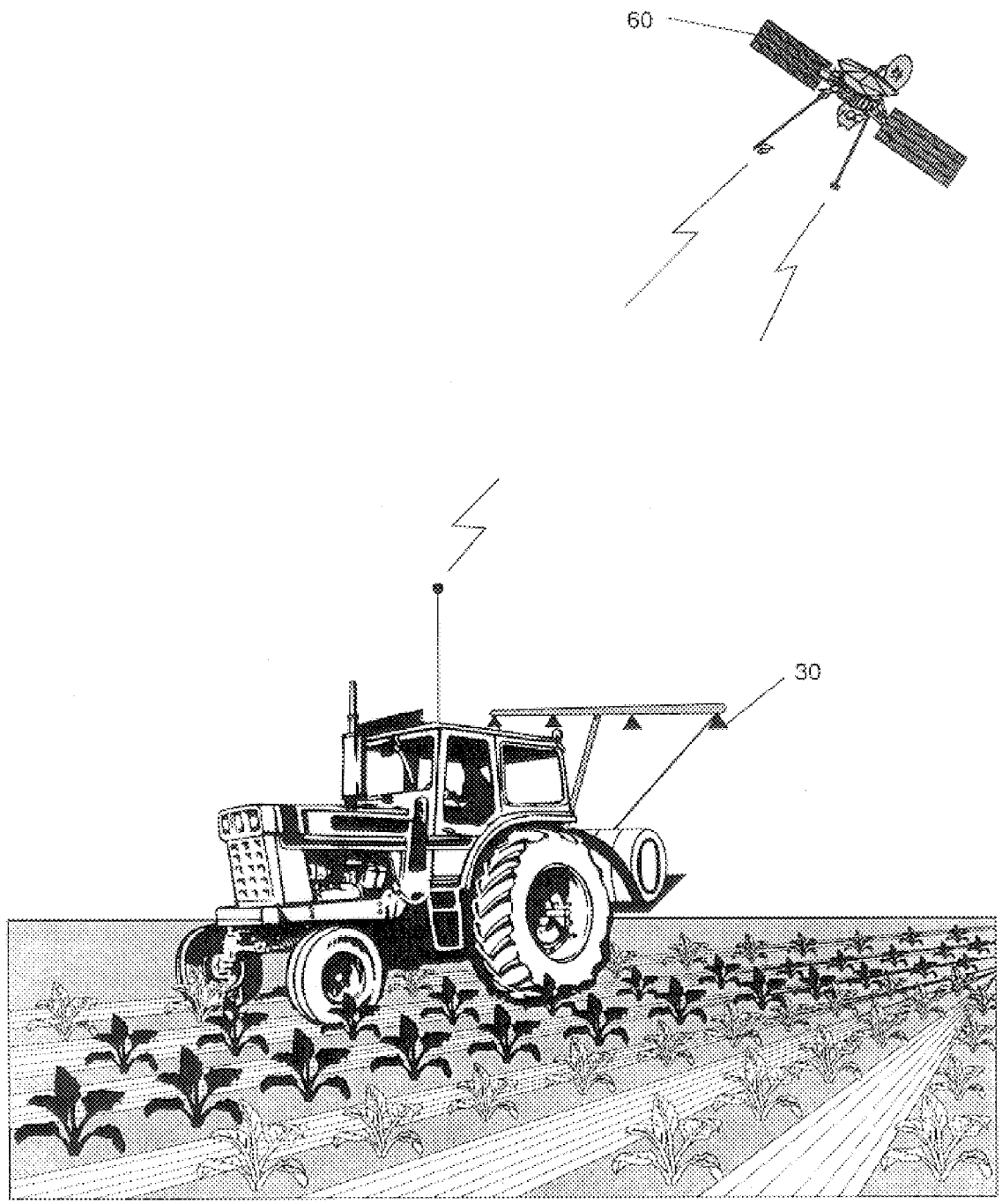
FIG. 11 is a diagrammatic view of a tractor mounted embodiment of the invention.
Figure 12:
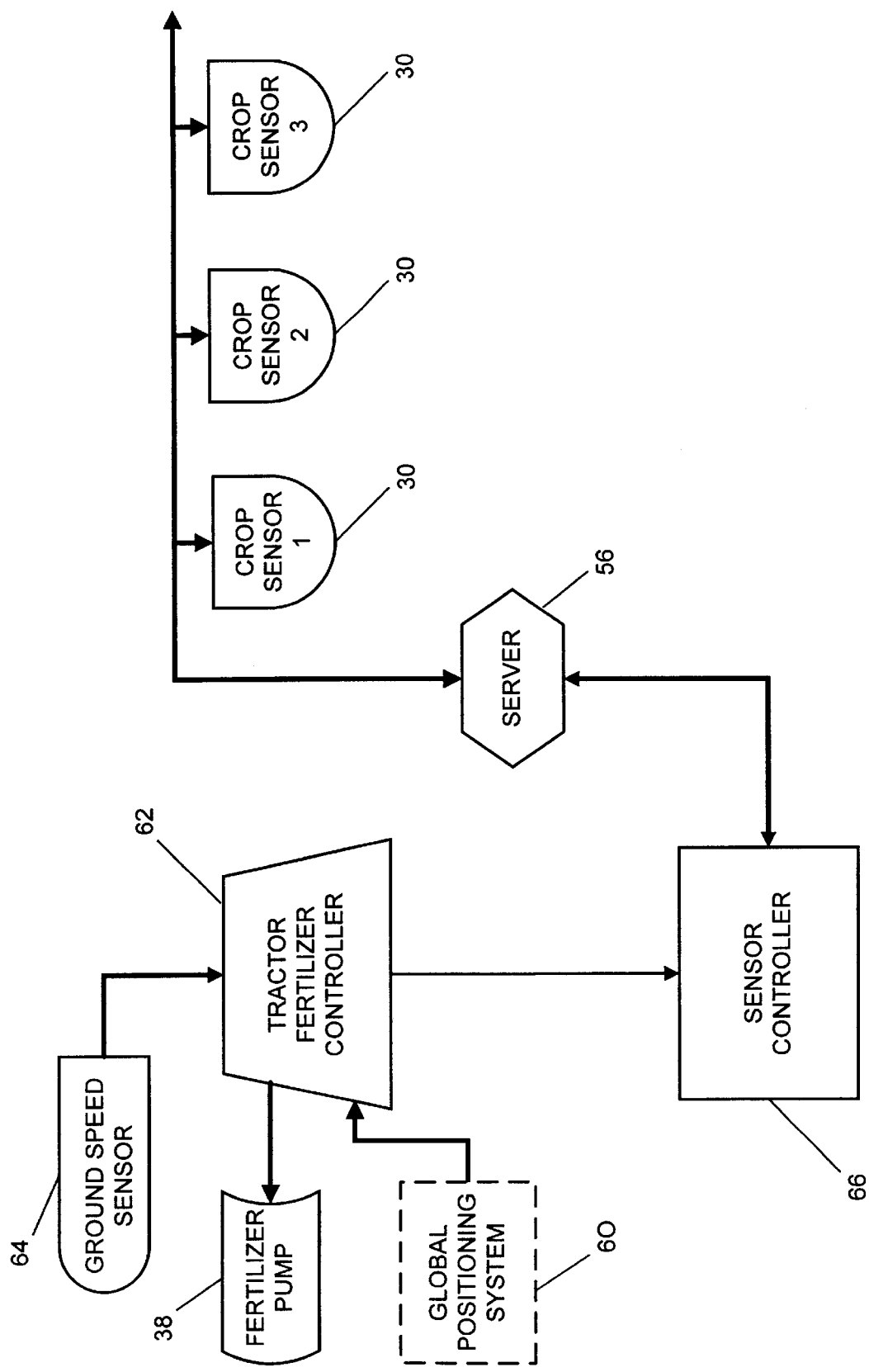
FIG. 12 is a block diagram of the tractor embodiment of the invention.

A second embodiment of the invention is shown in FIGS. 11 and 12 which utilizes sensors (30) attached to the boom of a tractor drawn fertilizer application system. The tractor system operates similarly to the center pivot system except that position information is obtained from the Global Positioning System (GPS) (60). The GPS (60) is required only if a "field map" of potential yield and fertilizer application is needed. Also, if a reference strip is not in constant view of the sensors, then GPS may be used to know when a sensor is taking a reference strip measurement. Alternatively, a marker post at the end of the field could mark the location of the reference strip. The tractor fertilizer controller (62) uses the ground speed sensor (64) to control the proper rate of fertilizer application as determined by the sensor. The sensor controller (66) directs the sensors (30) to take data simultaneously and transmit it to the sensor controller (66). The system can control fertilizer application in real time and/or map the fertilizer application prescribed or the potential yield with position information before the crop is harvested.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for controlling the application of fertilizer to a crop having a physical characteristic related to the fertilizer requirements of the crop, the crop having a non-reference area and a reference area, comprising the steps of:

providing a sensor which is responsive to said physical characteristics of said crop;

measuring said physical characteristic of said reference crop by passing said sensor over said crop by securement to a center pivot irrigation system and said application of fertilizer is by fertigation;

measuring said physical characteristic of said non-reference crop;

controlling the application of fertilizer to said crop in real time based on a comparison of said reference and non-reference crop physical characteristics; and computing said sensor position information for storage of crop physical characteristic data.

2. A method for controlling the application of fertilizer to a crop having a physical characteristic related to the fertilizer requirements of the crop, the crop having a non-reference area and a reference area, comprising the steps of:

(a) providing a sensor which is responsive to said physical characteristic of said crop;

(b) measuring said physical characteristic of said reference crop;

(c) measuring said physical characteristic of said non-reference crop;

(d) controlling fertilizer application to said crop in real time based on a comparison of said reference and non-reference crop physical characteristics wherein said measuring is accomplished by passing said sensor over said crop by securement to a tractor drawn fertilizer application system; and (e) computing sensor position information for storage of crop physical characteristic data using a Global Positioning System.

3. An apparatus for controlling the application of fertilizer to a crop having a physical characteristic related to the fertilizer requirements of the crop, the crop having a non-reference area and a reference area, comprising:

a sensor which is responsive to said physical characteristic of said crop;

means for measuring said physical characteristic of said reference crop;

means for measuring said physical characteristic of said non-reference crop wherein said measuring means comprises securement of said sensor to a center pivot irrigation system;

means for controlling the application of fertilizer to said crop in real time based on a comparison of said reference and non-reference crop physical characteristics; and means for computing and storing sensor position information.

4. An apparatus for controlling the application of fertilizer to a crop having a physical characteristic related to the fertilizer requirements of the crop, the crop having a non-reference area and a reference area, comprising:

(a) a sensor which is responsive to said physical characteristic of said crop;

(b) means for measuring said physical characteristic of said reference crop;

(c) means for measuring said physical characteristic of said non-reference crop;

(d) means for controlling fertilizer application to said crop in real time based on a comparison of said reference and non-reference crop physical characteristics wherein said measuring means comprises securement of said sensor to a tractor drawn fertilizer application system; and (e) means for computing sensor position information for storage of crop physical characteristic data using a Global Positioning System.

5. An optical crop sensor for detecting crop density differences based on differences in the crop/soil light reflectance, comprising:

(a) a first detector with a natural sensitivity limited to the visible part of the reflected spectrum;

(b) a second detector sensitive to the near-infrared part of the reflected spectrum;

(c) a diffuser for covering both detectors mounted in a side-by-fashion providing a common optical path.

6. A method for controlling the application of fertilizer to a crop having a physical characteristic related to the fertilizer requirements of the crop, the crop having a non-reference area and a reference area, comprising the steps of:

(a) providing a sensor which is responsive to said physical characteristic of said crop;

(b) measuring said physical characteristic of said reference crop;

(c) measuring said physical characteristic of said non-reference crop;

(d) controlling fertilizer application to said crop in real time based on a comparison of said reference and non-reference crop physical characteristics wherein said measuring is accomplished by passing said sensor over said crop by securement to a tractor drawn fertilizer application system; and (e) computing sensor position information for storage of crop physical characteristic data using a positioning system.

7. An apparatus for controlling the application of fertilizer to a crop having a physical characteristic related to the fertilizer requirements of the crop, the crop having a non-reference area and a reference area, comprising:

(a) a sensor which is responsive to said physical characteristic of said crop;

(b) means for measuring said physical characteristic of said reference crop;

(c) means for measuring said physical characteristic of said non-reference crop;

(d) means for controlling fertilizer application to said crop in real time based on a comparison of said reference and non-reference crop physical characteristics wherein said measuring means comprises securement of said sensor to a tractor drawn fertilizer application system; and (e) means for computing sensor position information for storage of crop physical characteristic data using a positioning system.

* * * * *